United States Patent
Kano et al.

(10) Patent No.: US 7,621,359 B2
(45) Date of Patent: Nov. 24, 2009

(54) HYBRID DRIVE APPARATUS

(75) Inventors: Seigo Kano, Anjo (JP); Satoru Wakuta, Anjo (JP); Kazuhisa Ozaki, Anjo (JP); Toshiharu Ikeda, Anjo (JP); Atsushi Ishibashi, Anjo (JP); Masahiro Kojima, Toyota (JP); Masatoshi Adachi, Toyota (JP)

(73) Assignees: Aisin AW Co., Ltd, Anjo (JP); Toyota Jidosha Kabushiki Kaisha, Toyota (JP)

( * ) Notice: Subject to any disclaimer, the term of this patent is extended or adjusted under 35 U.S.C. 154(b) by 533 days.

(21) Appl. No.: 11/229,201

(22) Filed: Sep. 19, 2005

(65) Prior Publication Data

US 2006/0081406 A1 Apr. 20, 2006

(30) Foreign Application Priority Data

Oct. 14, 2004 (JP) .............................. 2004-300803

(51) Int. Cl.
*B60K 6/20* (2007.10)
(52) U.S. Cl. ................... 180/65.21; 180/65.6; 180/65.7
(58) Field of Classification Search ............... 180/65.2, 180/65.21, 65.31, 65.51, 65.3, 65.4, 65.6, 180/65.7, 65.8; 903/903, 910, 911, 906; 475/5, 10, 151
See application file for complete search history.

(56) References Cited

U.S. PATENT DOCUMENTS

| | | | |
|---|---|---|---|
| 3,623,568 A * | 11/1971 | Mori .......................... | 180/65.2 |
| 5,603,671 A * | 2/1997 | Schmidt ........................ | 475/5 |
| 5,904,631 A * | 5/1999 | Morisawa et al. ............... | 475/5 |
| 5,935,035 A * | 8/1999 | Schmidt ........................ | 475/5 |
| 6,022,287 A * | 2/2000 | Klemen et al. ................. | 475/5 |
| 6,236,326 B1 * | 5/2001 | Murphy .................... | 340/636.1 |
| 6,358,173 B1 * | 3/2002 | Klemen et al. ................. | 475/5 |
| 6,478,705 B1 * | 11/2002 | Holmes et al. ................. | 475/5 |
| 6,491,599 B1 * | 12/2002 | Schmidt ........................ | 475/5 |
| 6,527,659 B1 * | 3/2003 | Klemen et al. ................. | 475/5 |
| 6,551,208 B1 * | 4/2003 | Holmes et al. ................. | 475/5 |
| 6,570,265 B1 * | 5/2003 | Shiraishi et al. ............ | 180/65.2 |
| 6,726,592 B2 * | 4/2004 | Kotani ........................ | 903/910 |
| 6,886,648 B1 * | 5/2005 | Hata et al. ................. | 180/65.2 |
| 7,223,200 B2 * | 5/2007 | Kojima et al. .................. | 475/5 |
| 7,393,296 B2 * | 7/2008 | Kano et al. .................... | 475/5 |
| 2004/0084233 A1 | 5/2004 | Wakuta et al. | |

FOREIGN PATENT DOCUMENTS

| | | |
|---|---|---|
| EP | 1 386 771 A2 | 2/2004 |
| EP | 1 481 832 A2 | 12/2004 |
| EP | 1 640 202 A1 | 3/2006 |
| JP | A 2002-225578 | 8/2002 |
| JP | A-2003-336725 | 11/2003 |
| JP | A 2004-066898 | 3/2004 |
| KR | 1998-054162 | 9/1998 |
| WO | WO 2005/000618 | 1/2005 |

* cited by examiner

*Primary Examiner*—Hau V Phan
(74) *Attorney, Agent, or Firm*—Oliff & Berridge, PLC

(57) ABSTRACT

An output shaft is divided into a first output shaft and a second output shaft. Torque from a motive power distributing planetary gear is transferred to the first output shaft. The first output shaft is supported on partition walls by a both-end support structure via bearings. Assist torque from a transmission is applied to the second output shaft. The second output shaft is also supported on partition walls by a both-end support structure via bearings.

14 Claims, 9 Drawing Sheets

FIG. 9

HYBRID DRIVE APPARATUS

INCORPORATION BY REFERENCE

The disclosure of Japanese Patent Application No. 2004-300803, filed on Oct. 14, 2004 including the specification, drawings and abstract is incorporated herein by reference in its entirety.

BACKGROUND

The disclosure pertains to a hybrid drive apparatus mounted in a motor vehicle, and a motor vehicle in which the apparatus is mounted, and particularly relates to a hybrid drive apparatus which is suitable for application to front engine, rear drive (FR) type vehicles, and in which an input shaft and an output shaft are disposed on one axis.

As a hybrid drive apparatus, a so-called mechanical distribution type (split type or two-motor type) of apparatus is conventionally known in which planetary gears whose elements are coupled to an engine output shaft, a control generator (first electric motor), and an output portion for transfer to wheels is used. Furthermore, a driving (assisting) motor (second electric motor) is coupled to the output portion, and the engine output is speed-shifted steplessly from the planetary gear to the output portion by controlling the generator. Still further, the motive power of the output portion is provided with an appropriate assist from the driving motor, and is thus output to the output shaft.

Hybrid drive apparatuses in which a transmission is interposed between the driving motor and the output shaft are disclosed in, for example, Japanese Patent Application Laid-Open Publication No. 2004-66898 or Japanese Patent Application Laid-Open Publication No. 2002-225578.

In a hybrid drive apparatus mounted in FR-type motor vehicles, the input shaft and the output shaft are disposed on one axis so as to be aligned with the engine output shaft, and therefore the structure thereof is elongate in the front-to-rear direction. Because the hybrid drive apparatus is adjacent to the cabin, and also because particularly FR type motor vehicles are often adopted for luxury cars, reductions of vibrations thereof are strongly demanded.

SUMMARY

Accordingly, it is an object to provide a hybrid drive apparatus that solves the aforementioned problem by forming an output shaft in a divided structure, and a motor vehicle in which the hybrid drive apparatus is mounted.

Therefore, while a structure in which an output shaft is elongate is created, because a motive power distributing planetary gear is disposed at the foremost end side, the output shaft is divided. Therefore, a divided first output shaft and a divided second output shaft are shorter than the single output shaft, so that production becomes easy, and the assembly characteristics improve. Furthermore, output from the motive power distributing planetary gear is transferred to the first output shaft, and output from the transmission is transferred to the second output shaft in addition to the output from the first output shaft. Therefore, it becomes possible to design the shaft diameters of the first output shaft and the second output shaft in accordance with the torque transferred.

BRIEF DESCRIPTION OF THE DRAWINGS

The disclosure will reference the drawings, in which.

DETAILED DESCRIPTION OF EMBODIMENTS

Therefore, for the reduction of vibrations, it is desirable that, of the elements, that is, the control generator (first electric motor), the motive power distributing planetary gear, the transmission and the driving motor (second electric motor), the driving motor, which is the heaviest element, be disposed at a rearmost end side of the transmission case (a side opposite from the engine), and a rear end portion of the case be supported on the vehicle body via a gum (rubber) mount. Furthermore, it is desirable also in terms of the quietness of the cabin that a driving motor that produces less noise be disposed adjacent to the cabin.

Figure 9:
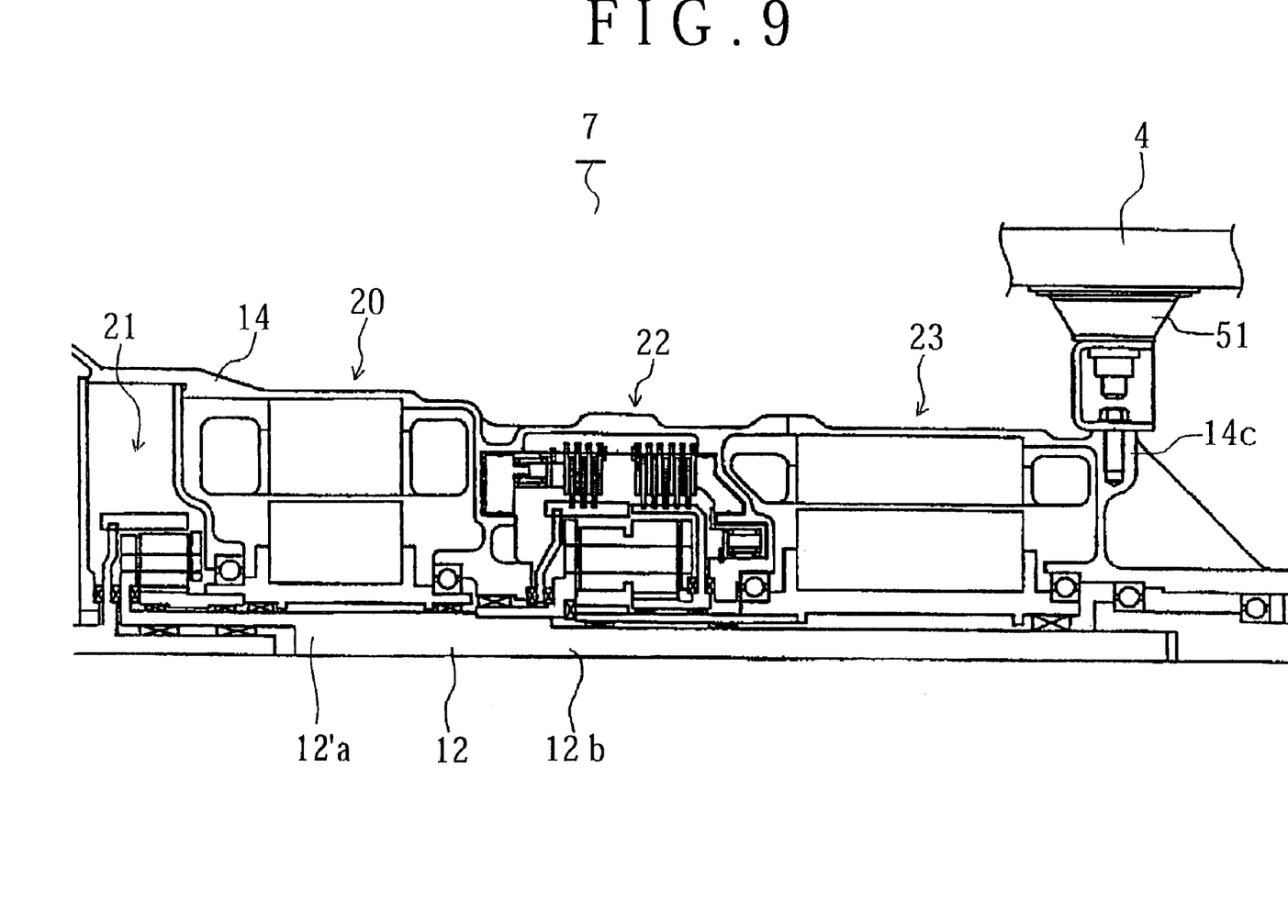
FIG. 9 is a longitudinal sectional view showing a structure of a hybrid drive apparatus as a "prototype" that was considered by the applicant.

According to this layout, for example, as a "prototype" as shown in FIG. 9, a motive power distributing planetary gear 21, a control generator (first electric motor) 20, a transmission 22, and a driving motor (second electric motor) 23 that is the heaviest element are disposed sequentially from the engine side, and a rear end portion 14c of a transmission case 14 formed by an integral case member that houses these elements is supported on a vehicle body 4 via gum mounts 51. In this instance, an elongate structure is formed in which the output shaft 12' extends substantially through the entire length of the hybrid drive apparatus 7'. Incidentally, the hybrid drive apparatus illustrated in FIG. 9 is an apparatus that was considered in the applicant company, i.e., can be thought of as a "prototype" in the development of the apparatus described in detail below, and is the subject of PCT publication No. WO2005/000618A1, published Jan. 6, 2005, although FIG. 9 itself does not appear in the PCT application, but is presented here to show the "prototype". The disclosure of WO2005/00618A1 is incorporated herein by reference.

As for the elongate output shaft 12', production thereof is difficult, and moreover, it is difficult to obtain a support precision for the output shaft. Furthermore, due to the forgoing layout structure of the hybrid drive apparatus 7', the output shaft 12' needs to be inserted from forward of the drive apparatus 7' for assembly. Therefore, the output shaft 12' is thick in diameter (large in diameter) at a forward side thereof, and becomes progressively narrower in diameter (smaller in diameter) towards a rearward side. In addition to the input to a front end side 12'a of the output shaft 12' from the motive power distributing planetary gear 21, the torque of the driving motor 23 is transferred to an intermediate portion 12'b of the output shaft via the transmission 22. Therefore, as for the output shaft 12', the shaft diameter is set on the basis of the torque on a rearward portion of the shaft which is the sum of the engine torque from the motive power distributing planetary gear 21 and the assist torque from the driving motor 23.

As the output shaft 12' becomes thick in diameter at a forward portion thereof due to its assembly as described above, the diameter of the output shaft 12' set from the load torque on the rearward portion thereof becomes large overall, and becomes an impediment factor in making the hybrid drive apparatus compact to improve the vehicle mountability.

Figure 1:
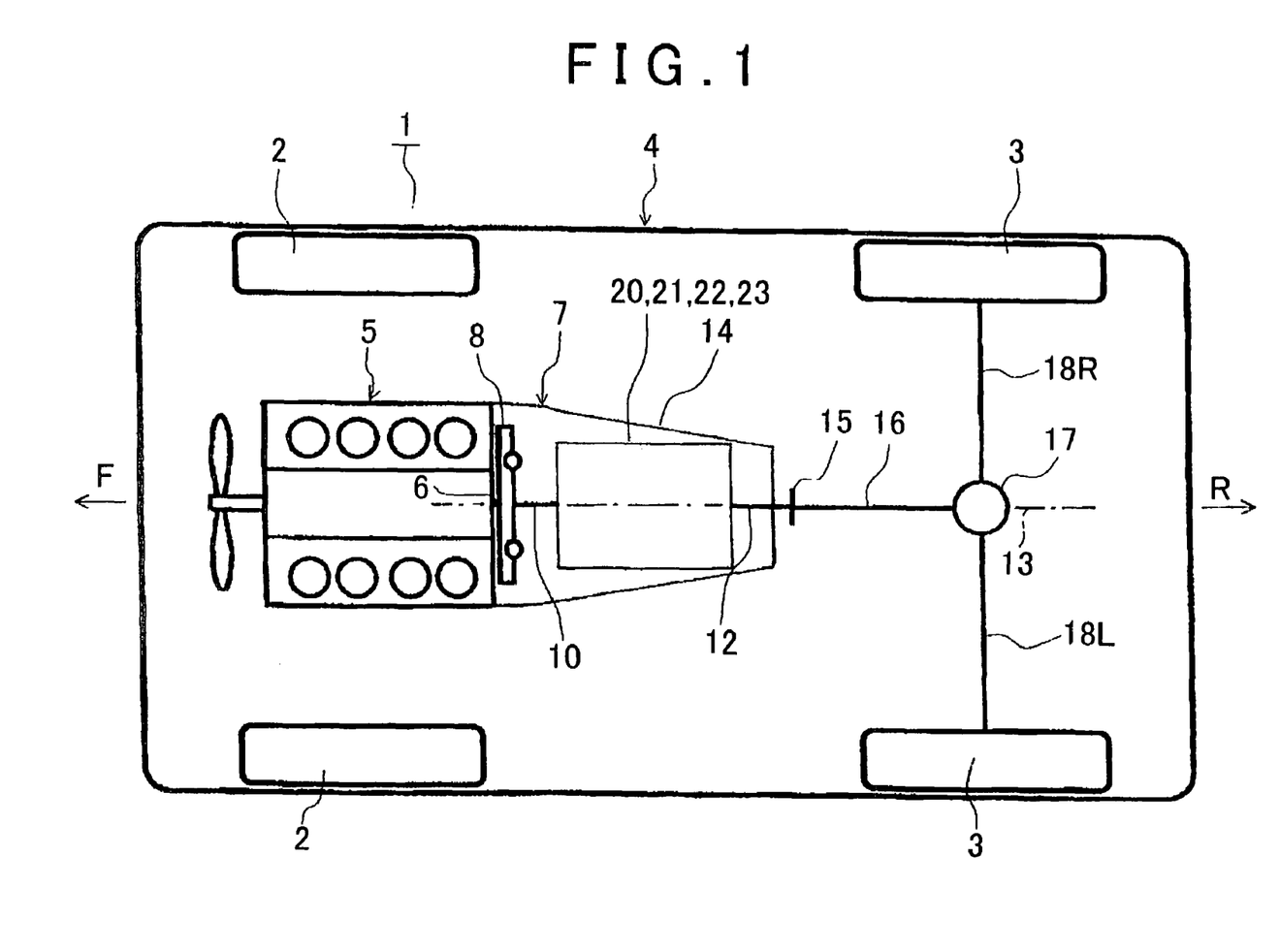
FIG. 1 is a plan view schematically showing a motor vehicle in which a hybrid drive apparatus is mounted.

Exemplary embodiments will be described hereinafter with reference to the drawings. FIG. 1 shows an example of a motor vehicle 1 in which a hybrid drive apparatus is mounted. The motor vehicle 1 shown in the drawing is a FR type motor vehicle, and the drawing is a plan view schematically showing an overall structure thereof. Incidentally, in a real motor vehicle, the direction indicated by an arrow F in the drawing is toward a front side, and the direction indicated by an arrow R is toward a rear side.

The motor vehicle 1 shown in this drawing is provided with a vehicle body 4 supported by left and right front wheels 2, 2, and left and right rear wheels 3, 3 that are driving wheels. In a front portion of the vehicle body 4, an internal combustion engine 5 is mounted via a rubber mount (not shown) in a state where the crankshaft 6 is directed in the front-to-rear direction. Incidentally, in the drawing, an output shaft formed by a rearward protruded portion of the crankshaft is depicted as a crankshaft 6. A hybrid drive apparatus 7 is coupled to a rear end of the internal combustion engine 5.

The hybrid drive apparatus 7 has an input shaft 10 connected to the crankshaft 6 of the internal combustion engine 5 via a damper device 8 as well as a first electric motor 20, a motive power distributing planetary gear 21, a transmission 22, a second electric motor 23 (see FIG. 2), and an output shaft 12 that outputs drive power. The input shaft 10 is disposed at a front side, and the output shaft 12 is disposed at a rear side, and they are arranged on one axis 13. The input shaft 10 and the output shaft 12 are disposed facing in the front-to-rear direction relative to the vehicle body 4, and are housed together with the first electric motor 20, the motive power distributing planetary gear 21, the transmission 22 and the second electric motor 23 within a transmission case (case member) 14 that is elongate in the front-to-rear direction. The hybrid drive apparatus 7 will be described later in detail.

The output shaft 12 of the hybrid drive apparatus 7 protrudes from a rear end of the above-described case member 14 and extends further rearward, and is coupled to a differential apparatus 17 via a flexible coupling 15 and a known propeller shaft 16 (in reality, a universal joint, a center bearing, etc. are provided, but are not depicted). Furthermore, the differential apparatus 17 is coupled to the previously described left and right rear wheels 3, 3 via a left driving shaft 18L and a right driving shaft 18R.

In the motor vehicle 1 with the above-described structure, the motive power generated by the internal combustion engine 5 is input to the input shaft 10 of the hybrid drive apparatus 7, and is adjusted by the first electric motor 20, the motive power distributing planetary gear 21, the transmission 22 and the second electric motor 23 described later, and then is output from the output shaft 12. Then, the adjusted motive power is transferred to the left and right rear wheels 3, 3, which are driving wheels, via the propeller shaft 16 and the remaining drive train.

Next, a hybrid drive apparatus $7_1$ in accordance with a first exemplary embodiment, which is mounted in the motor vehicle 1 shown in FIG. 1, will be described with reference to FIGS. 2 and 3. Firstly, a brief overall description of the hybrid drive apparatus $7_1$ will be given with reference to the schematic diagram of FIG. 2. Subsequently, specific structures will be described in detail with reference to FIG. 3. With regard to these drawings, the direction indicated by an arrow F is toward the front side (internal combustion engine side), and the direction indicated by an arrow R is toward the rear side (differential apparatus side) of the vehicle.

Figure 2:
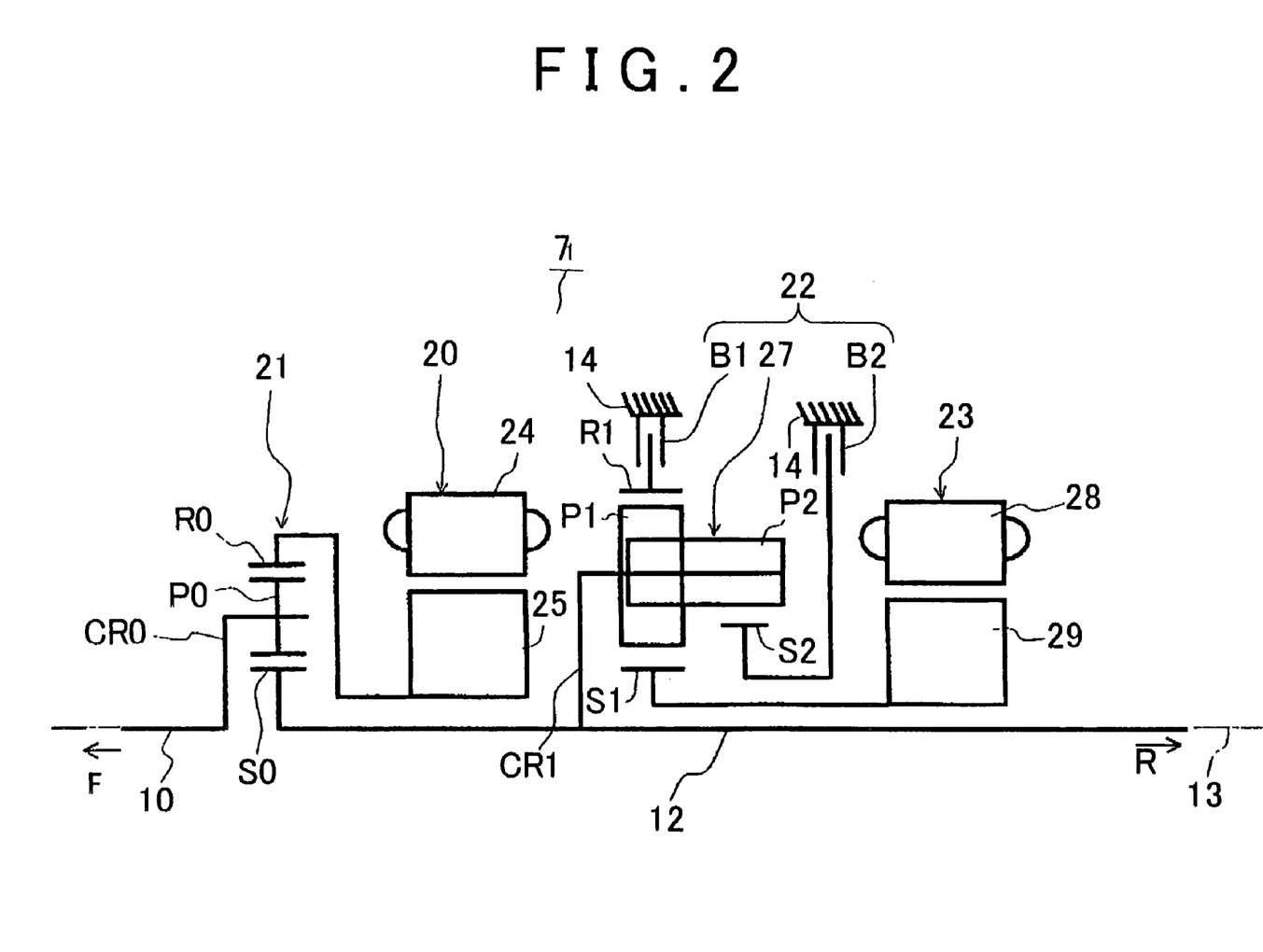
FIG. 2 is a schematic diagram showing a hybrid drive apparatus according to an exemplary embodiment.

As shown in FIG. 2, the hybrid drive apparatus $7_1$ is provided with the motive power distributing planetary gear 21, the first electric motor 20, the transmission 22 and the second electric motor 23 arranged sequentially from the side closer to the internal combustion engine 5, that is, from the front side toward the rear side. These are all housed inside the case member 14 (see FIG. 1), and are arranged in alignment around the one axis 13. Incidentally, in this embodiment, the output shaft 12 is divided into a front-side first output shaft $12_1$, a rear-side second output shaft $12_2$, and an extended shaft $12_3$ protruding from a rear end of the case member. The three shafts $12_1$, $12_2$, $12_3$ are structured so as to rotate together (see FIG. 3). Hereinafter, description will be given of the motive power distributing planetary gear 21, the first electric motor 20, the transmission 22 and the second electric motor 23 in that order.

The motive power distributing planetary gear 21 is structured by a single-pinion planetary gear that is disposed coaxially with the input shaft 10. The motive power distributing planetary gear 21 has a carrier (first rotating element) CR0 that supports a plurality of pinions P0, and a sun gear (third rotating element) S0 and a ring gear (second rotating element) R0 that each mesh with the pinions P0. As for the motive power distributing planetary gear 21, the carrier CR0 is coupled to the input shaft 10, and the ring gear R0 is coupled to a rotor 25 of the first electric motor 20, and the sun gear S0 is coupled to the output shaft 12. The motive power distributing planetary gear 21 distributes the motive power input to the carrier CR0 via the input shaft 10 to the first electric motor 20 side via the ring gear R0, and to the output shaft 12 side via the sun gear S0, on the basis of rotation speed control of the first electric motor 20. Incidentally, the motive power distributed to the first electric motor 20 is used for electric power generation and, on the other hand, the motive power distributed to the output shaft 12 is used for driving the motor vehicle 1.

The first electric motor 20 has a stator 24 secured to the case member 14, and the rotor 25 that is freely rotatably supported at a radially inward side of the stator 24 (in the below description, with regard to the positions in radial directions related to the case member 14, a side closer to the one axis 13 will be referred to as a "radially inward side", and a side remote therefrom will be referred to as a "radially outward side"). The rotor 25 of the first electric motor 20 is coupled to the ring gear R0, of the motive power distributing planetary gear 21. The first electric motor mainly performs electric power generation on the basis of the motive power input via the ring gear R0, and drives the second electric motor 23 via an inverter (not shown), or performs charging of a hybrid drive-purpose (HV) battery (not shown).

The transmission 22 has a so-called Ravigneaux type planetary gear unit 27 made up of one double-pinion planetary gear and a single-pinion planetary gear that shares pinions with the double-pinion planetary gear, and further has a first brake B1 and a second brake B2.

Among these components, the planetary gear unit 27 is structured by two sun gears S1, S2, a carrier CR1 that supports pinions P1 and pinions (common long pinions) P2, and a ring gear R1. Of the two kinds of pinions P1, P2, the pinions P1 mesh with the sun gear S1 and the ring gear R1, and the pinions P2, i.e., the common long pinions, mesh with the sun gear S2 and the pinions P1. As for the planetary gear unit 27, the ring gear R1 is coupled to the first brake B1, and the sun gear S2 is coupled to the second brake B2. In the transmission 22 as a whole, the sun gear S1, which is an input member, is connected to a rotor 29 of the second electric motor 23, described next, and the carrier CR1, which is an output member, is coupled to the output shaft 12, similarly to the sun gear S0 of the motive power distributing planetary gear 21. The transmission 22 is designed to switch between two speed reduction stages of different speed reduction ratios by engaging one of the first and second brakes B1, B2 and releasing the other, or conversely, releasing the one and engaging the other. That is, the transmission 22 is designed to change the magnitude of torque input from the second electric motor 23 via the sun gear S1, and transfers the changed torque to the output shaft 12 via the carrier CR1.

The second electric motor 23 is disposed most rearward, that is, at a position that is the farthest from the internal combustion engine 5, among the motive power distributing planetary gear 21, the first electric motor 20, the transmission 22 and the second electric motor 23. The second electric motor 23 has a stator 28 secured to the case member 14 (see FIG. 1), and the rotor 29 that is freely rotatably supported at a radially inward side of the stator 28. The rotor 29 of the second electric motor 23 is coupled to the sun gear S1 of the transmission 22. Similar to the previously described first electric motor 20, the second electric motor 23 is connected to the HV battery via an inverter (not shown). However, the main functions of the electric motors 20, 23 are different. That is, unlike the first electric motor 20, used mainly for electric power generation, the second electric motor 23 mainly functions as a drive motor to provide an assist in the motive power (drive power) of the motor vehicle 1. However, during braking or the like, the second electric motor 23 functions as a generator for regeneration of the inertia force of the vehicle as electric energy.

It is to be noted here that among the motive power distributing planetary gear 21, the first electric motor 20, the transmission 22 and the second electric motor 23, the first and second electric motors 20, 23 are so-called heavy components that have greater weights than the motive power distributing planetary gear 21 and the transmission 22. In this embodiment, the second electric motor 23, which is one of the heavy components, is disposed most rearward, that is, at a position that is the farthest from the internal combustion engine 5, among the motive power distributing planetary gear 21, the first electric motor 20, the transmission 22 and the second electric motor 23, as shown in FIG. 2.

Figure 3:
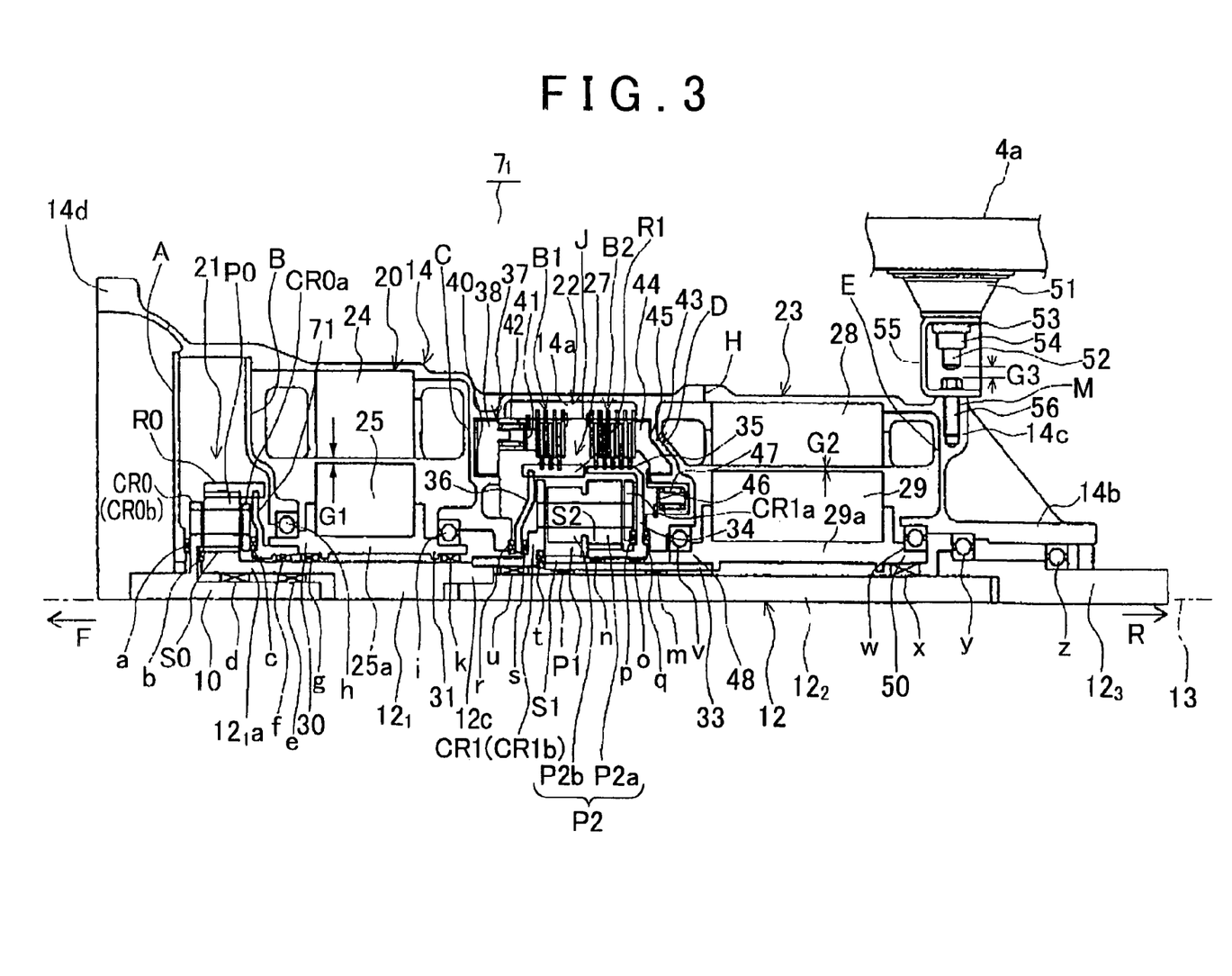
FIG. 3 is a longitudinal sectional view showing a structure of the hybrid drive apparatus according to the exemplary embodiment.

FIG. 3 shows a half of a longitudinal section of the hybrid drive apparatus $7_1$ which includes the one axis 13. The hybrid drive apparatus $7_1$ is provided with the input shaft 10 and the output shaft 12 that are disposed on the one axis 13, as well as the motive power distributing planetary gear 21, the first electric motor 20, the transmission 22 and the second electric motor 23 that are arranged along and coaxial with the one axis 13. These are all housed together with the input shaft 10 and the output shaft 12 within the case member (transmission case) 14. However, the extended shaft $12_3$ in the rear end side of the output shaft 12 protrudes rearwardly from the case member 14.

Considering the assembling characteristic and the like, the case member 14 is integrally structured by joining a plurality of portions that are divided in the front-to-rear direction along the one axis 13 on their joint surfaces. A joint surface H is positioned near the front portion of the second electric motor 23, and a joint surface J is disposed between the first and second brakes B1, B2 in the transmission 22. It is appropriate that the joint surface J be disposed between hydraulic actuators 37, 43 of the brakes B1, B2. In the case member 14, a plurality of partition walls, that is, partition walls A, B, C, D, E in that order from a front side, are formed at different positions in the front-to-rear direction. Of these partition walls A to E, the partition walls A, E are walls disposed near the front end and the rear end of the case member 14, respectively. An in-case space between the front wall A and the rear wall E is divided into four spaces in the front-to-rear direction along the one axis 13 by the partition walls B, C, D. These partition walls A to E act as strength members of the case member 14, and are also used for retention of bearings a to z (described later) and formation of hydraulic chambers 40, 45 (described later). Incidentally, partition wall C supports junction portions between divided output shaft 12 described later. The partition wall C is integrally formed as a portion of the case member 14. The partition walls D, E, supporting the rotor 29 of the second electric motor 23, are also formed integrally with the case member 14. The partition walls A, B are integrally fixed to the case member 14 with bolts. Therefore, it becomes possible to accomplish the assembling while minimizing the division surfaces (joint surfaces) H, J of the case member 14, and the support rigidity of the output shaft 12 cal % be made high.

The motive power distributing planetary gear 21, the first electric motor 20, the transmission 22, and the second electric motor 23 are housed within the four spaces divided by the partition walls A to E, respectively. That is, the motive power distributing planetary gear 21 is housed between the partition walls A, B, the first electric motor 20 between the partition walls B, C, the transmission 22 between the partition walls C, D, and the second electric motor 23 between the partition walls D, E. Hereinafter, the components will be sequentially described in detail starting with the motive power distributing planetary gear 21.

The motive power distributing planetary gear 21 is disposed between the partition walls A, B of the case member 14. The motive power distributing planetary gear 21 is structured by the single-pinion planetary gear disposed coaxially with the input shaft 10 as previously described, and has the ring gear (second rotating element) R0, the sun gear (third rotating element) S0, and the carrier (first rotating element) CR0 supporting the pinions P0. Among these, the ring gear R0 extends rearwardly, and is coupled to a shaft portion (hereinafter, referred to as "boss portion" or "rotor boss portion") 25a of the rotor 25 of the first electric motor 20 via a coupling member 71. The coupling member 71 has a flange portion, that is coupled to a rear end of the ring gear R0 and that extends to a radially inward side in the rear of the carrier CR0, and a sleeve portion, that extends from a radially inward-side end portion of the flange portion. The sleeve portion is coupled to a front end of the rotor boss portion 25a. A carrier plate CR0b of the carrier CR0 is coupled to an outer peripheral surface of the input shaft 10. Furthermore, the sun gear S0 is coupled to a sleeve portion $12_{1a}$ that extends forward from the first output shaft $12_1$ of the output shaft 12.

As previously described, the output shaft 12 is formed by an elongate member that extends substantially through the entire length of the case member (transmission case) 14. The output shaft 12 is divided into a plurality of parts, and the divided first and second output shafts $12_1$, $12_2$ and the extended shaft $12_3$ are spline-fitted to each other at coupling portions, where two shafts overlap with each other, to rotate together. As described above, a distributed output from the motive power distributing planetary gear 21 (i.e., output from the internal combustion engine) is transferred at a front end portion of the front end-side sleeve portion $12_{1a}$ of the first output shaft 12, positioned at a front side.

With regard to the motive power distributing planetary gear 21, bearings are fitted at the following positions. A thrust bearing a is fitted between a radially inward-side rear surface of the partition wall A and the front-side carrier plate CR0b, and a thrust bearing b between a radially inward-side rear surface of the front-side carrier plate CR0b and a front end surface of the sun gear S0. Radial bearings d, e formed by a slip bearing or a needle bearing are fitted between an outer peripheral surface of the input shaft 10 and an inner peripheral surface of the sun gear S0 and the sleeve portion $12_{1a}$. Bearings c, f are fitted between a radially inward-side front surface of the flange portion of the coupling member 71 and a rear-side carrier plate CR0a, and between an inner peripheral surface of the sleeve portion of the coupling member 71 and an outer peripheral surface of the sleeve portion $12_{1a}$. These bearings freely rotatably support the carrier CR0 integrally with the input shaft 10, and the ring gear R0 integrally with the rotor 25 of the first electric motor 20, and, furthermore, the sun gear S0 integrally with the output shaft 12. Thus, as for the motive power distributing planetary gear 21, the carrier CR0, which is an input portion, is secured to the input shaft 10, and the ring gear R0 and the sun gear S0, which are output portions (destinations of distribution of motive power), are coupled to a front end of the rotor 25 of the first electric motor 20, and a front end of the front end coupling portion $12_{1a}$ of the output shaft 12, respectively. The motive power distributing planetary gear 21 is designed so as to distribute the motive power of the internal combustion engine 5 (see FIG. 1) input to the carrier CR0 via the input shaft 10 to a first electric motor 20 side via the ring gear R0, and to an output shaft 12 side via the sun gear S0. The proportions of distribution of the motive power will be determined on the basis of the state of rotation of the first electric motor 20 described below. That is, if the rotor 25 of the first electric motor 20 is caused to generate greater power, the amount of electric power generated by the first electric motor 20 increases, and the motive power output to the output shaft 12 correspondingly decreases. Conversely, if the rotor 25 of the first electric motor 20 is caused to generate small power, the amount of electric power generated by the first electric motor 20 decreases, and the motive power output to the output shaft 12 correspondingly increases.

The first electric motor 20 is structured by, for example, an alternating-current permanent magnet synchronous type motor (brushless DC motor), and is housed between the partition walls B, C, and is disposed at the radially outward side of the input shaft 10, coaxially therewith. The first electric motor 20 has the stator 24 that is secured to an inner peripheral surface of the case member 14, and the rotor 25 that is freely rotatably disposed at a radially inward side of the stator 24 with a predetermined air gap G1 left therebetween. As for the rotor 25, a cylindrical boss portion 25a is formed on a radially inward side thereof, and step portions 30, 31 are formed in an outer peripheral surface of a front portion of the boss portion 25a and an outer peripheral surface of a rear portion thereof, respectively. The rotor 25 is freely rotatably supported by the case member 14 via ball bearings h, i that are fitted between the step portions 30, 31 and the partition walls B, C in a state of being positioned in the front-to-rear direction.

Furthermore, as for the first output shaft $12_1$, at the ball bearing h portion at a front side of the shaft, the front end sleeve $12_{1a}$ is freely rotatably supported on an inner peripheral surface of the rotor boss portion 25a via needle or slip bearings f, g. At the ball bearing i portion at a rear side of the shaft, a rear-end overlap-joint portion of the shaft is supported on an inner peripheral surface of the rotor boss portion 25a via a needle or slip bearing k. That is, the rotor 25 of the first electric motor 20 is supported by a both-end support structure via the ball bearings h, i on the front partition wall B and the rear partition wall C, respectively. The first output shaft $12_1$ is also supported by a both-end support structure by the bearings (shaft bearing members) f, g and k via the rotor boss portion 25a (i.e., indirectly) on the two partition walls B, C. Incidentally, with regard to the position of arrangement in the front-to-rear direction, the bearings g, f are disposed at a position corresponding to the bearing h, and the bearing k is disposed at a position corresponding to the bearing i. Thus, as the rotor 25 of the first electric motor 20 is freely rotatably supported by the case member 14 via the bearings h, i secured to the partition walls B, C, the position of the rotor 25 in the front-to-rear direction and in a radial direction is set with good precision. Therefore, for example, if a force acts so as to curve the case member 14 in a top-to-bottom direction or a left-to-right direction, the predetermined air gap G1 can be maintained between the stator 24 and the rotor 25 with good precision. Incidentally, the first electric motor 20 is connected to the HV battery via the inverter as previously described. A main function of the first electric motor 20, with the above-described structure is to generate electric power on the basis of the motive power distributed to the sun gear S0 of the previously described motive power distributing planetary gear 21 and drive the second electric motor 23 or charge the HV battery via the inverter.

The transmission 22 is disposed between the partition walls C, D of the case member 14, that is, in a substantially intermediate portion of the case member 14 in a lengthwise direction (direction along the one axis 13). The transmission 22 has the Ravigneaux type planetary gear unit 27 disposed at a radially inward side, and the first brake B1 and the second brake B2 that are arranged at a front side and a rear side at a radially outward side of the gear unit, respectively.

Among these, the planetary gear unit 27 has the first sun gear S1 (hereinafter, simply referred to as "sun gear S1") disposed near an outer peripheral surface of a front end side of the second output shaft $12_2$, the second sun gear S2 (hereinafter, simply referred to as "sun gear S2") disposed rearward of the sun gear S1 and at a radially outward side of the sun gear S1, the ring gear R1 disposed at the radially outward side of the sun gear S1, the pinions P1 that mesh with the sun gear S1 and the ring gear R1, the pinions P2 that constitute the common long pinions and that mesh with the sun gear S2 and the pinions P1, and the carrier CR1 that supports the pinions P1, P2.

The front side of the second output shaft $12_2$ is fitted to the first output shaft $12_1$. The first output shaft $12_1$ is on the outer peripheral side where fitted to the second output shaft $12_2$. The rear side of the second output shaft $12_2$ is fitted to the extended shaft $12_3$, the extended shaft $12_3$ is also on the outer peripheral side of the second output shaft $12_2$. The second output shaft $12_2$, together with the first output shaft $12_1$ and the extended shaft $12_3$, structures the output shaft 12 that integrally rotates. The front side of the second output shaft $12_2$, together with the rear side of the first output shaft $12_1$, is supported on the rear partition wall C for supporting the rotor of the first electric motor 20, via the ball bearing i, the rotor boss portion 25a, and the bearing k. The rear side of the second output shaft $12_2$, together with the extended shaft $12_3$, is supported on the rear wall E of the case member 14, via a ball bearing w, a rotor boss portion 29a of the second electric motor 23, and a bearing x, and via a bearing y. Thus, the second output shaft $12_2$ is supported by a both-end support structure on the case member 14. Incidentally, the aforementioned rear wall E is a rear partition wall that supports the rotor 29 of the second electric motor by a both-end support structure.

The sun gear S1 is coupled to a front end of the rotor 29 of the second electric motor 23, via a sleeve 33 fitted onto an outer peripheral surface of a front half portion of the second output shaft $12_2$. The sun gear S1, together with the sleeve 33, is freely relatively rotatably supported by the first output shaft 12, via bearings l, m fitted onto an outer peripheral surface of the second output shaft $12_2$.

As for the sun gear S2, a flange portion 34 extending from a rear end side thereof to a radially outward side along the rear-side carrier plate CR1a of the carrier CR1, and a drum portion 35 extending forward from a radially outward-side end portion of the flange portion 34 are formed integrally therewith. The second brake B2, described later, is provided between an outer peripheral surface of the drum portion 35 and an inner peripheral spline 14a of an inner peripheral surface of the case member 14. The sun gear S2 is freely rotatably supported by bearings n, o fitted to an outer peripheral surface of the sleeve 33 provided integrally with the sun gear S 1, and bearings p, q fitted to a front surface and a rear surface, respectively, of a radially inward side (base end side) of the flange portion 34. Incidentally, the bearings is provided between the flange 34 and a radially inward-side rear surface of the rear-side carrier plate CR1a of the carrier CR1. The bearing q is provided between the flange 34 and a radially inward-side front surface of the partition wall D.

As for the ring gear R1, a flange portion 36 extending to a radially inward side along a front-side carrier plate CR1b of the carrier CR1 is secured to a distal end portion of the ring gear R1. The ring gear R1 is freely rotatably supported by bearings r, s fitted to a front surface and a rear surface of a radially inward side of the flange portion 36. The bearing r is provided between the flange portion 36 and a radially inward-side rear surface of the partition wall C. The bearing s is provided between the flange portion 36 and the front-side carrier plate CR1b of the carrier CR1. The first brake B1 is provided between an outer peripheral surface of the ring gear R1 and an inner peripheral spline 14a of an inner peripheral surface of the case member 14.

The pinions P1 are freely rotatably supported by the carrier CR1, and are meshed, at the radially inward side, with the sun gear 1, and, at the radially outward side, with the ring gear R1.

The pinions P2 are the common long pinions each of which includes a large-diameter gear P2a formed at a rear side and a small-diameter gear P2b formed at a front side that are integrally combined. The large-diameter gear P2a, of the pinions P2, is meshed with the sun gear S1, and the small-diameter gear P2b, of the pinions P2, is meshed with the pinions P1.

As for the carrier CR1, the front-side carrier plate CR1b and the rear-side carrier plate CR1a freely rotatably support the pinions P1, P2, and the front-side carrier plate CR1b is secured to the outer peripheral surface of a rear end side of the front end coupling portion 12c of the output shaft 12. The carrier CR1 is freely, relatively rotatably supported by bearings s, t fitted to a front surface and a rear surface of a radially inward side of the front-side carrier plate CR1b, a bearing u fitted between the carrier CR1 and a front end side of the second output shaft $12_2$, and the bearing p fitted to a radially inward-side front surface of the rear-side carrier plate CR1a. Incidentally, the bearing t is disposed between the carrier CR1 and a front end surface of the sun gear S1.

The first brake B1 has many discs and friction plates (brake plates), and is spline-joined between an outer peripheral spline formed in an outer peripheral surface of the above-described ring gear R1 and the inner peripheral spline 14a formed in an inner peripheral surface of the case member 14. The hydraulic actuator 37 for the first brake B1 is arranged at a front side of the first brake B1. The hydraulic actuator 37 has a piston 38 disposed forward of the first brake B1 so as to be movable in the front-to-rear direction, the first hydraulic chamber 40 is provided on a radially outward-side rear surface of the partition wall C and to which a front end side of the piston 38 is oil-tightly fitted. A return spring (compressed spring) 42 is interposed between a retainer 41 secured to the inner peripheral surface of the case member 14 and a radially outward-side rear surface of the piston 38 so as to urge the piston 38 forward.

The second brake B2 is disposed immediately rearward of the first brake B1. The second brake B2 has many discs and friction plates (brake plates), and is spline-joined between an outer peripheral spline formed in an outer peripheral surface of a drum portion 35 that is integral with the above-described sun gear S2, and the inner peripheral spline 14a formed in the inner peripheral surface of the case member 14. The hydraulic actuator 43 for the second brake B2 is arranged at a rear side of the second brake B2. The hydraulic actuator 43 has a piston 44 disposed rearward of the second brake B2 so as to be movable in the front-to-rear direction. The second hydraulic chamber 45 is provided on a radially outward-side front surface of the partition wall D and to which a rear end side of the piston 44 is oil-tightly fitted. A return spring (compressed spring) 47 is interposed between a retainer 46 secured to the partition wall D and a radially inward-side front surface of the piston 44 so as to urge the piston 44 rearward.

In the transmission 22, with the above-described structure, the output from the second electric motor 23 is transferred to the sun gear S1 via the sleeve 33. During a LOW state, the first brake B1 is engaged, and the second brake B2 is released. Therefore, the ring gear R1 is in a fixed state, the sun gear S2 is in a free rotating state, and the rotation of the aforementioned first sun gear S1 is considerably reduced in speed via the pinions P1, and is then transferred to the carrier CR1. The rotation of the carrier CR1 is transferred to the output shaft 12.

Furthermore, during a HIGH state of the transmission 22, the first brake B1 is released, and the second brake B2 is engaged. Therefore, the sun gear S2 is in a fixed state, and the ring gear R1 is in a free rotating state. During this state, the rotation of the sun gear S1 is transferred to the pinions P1, and the pinions P2 mesh with the sun gear S2 that is in a stopped state, and the carrier CR1 revolves at a restricted predetermined rotation. In this occasion, relatively slightly reduced-speed rotation of the carrier CR1 is transferred to the output shaft 12.

Thus, the transmission 22, in a LOW state, transfers to the output shaft 12 a rotation that is greatly reduced in speed due to the first and second brakes B1, B2 engaged and released, respectively. In the HIGH state, on the other hand, the transmission 22 transfers to the output shaft 12 a rotation that is relatively slightly reduced in speed due to the first and second brakes B1, B2 released and engaged, respectively. Thus, the transmission 22 is able to shift the speed in two steps, so that a size reduction of the second electric motor 23 becomes possible. That is, using a small-size electric motor, it is possible to, for example, transfer, in the LOW state, sufficient drive torque to the output shaft 12 at the time of start of the motor vehicle 1 when high torque is needed, and to select the HIGH state at the time of high rotation speed of the output shaft 12 so as to prevent the rotation speed of the rotor 29 from becoming high.

The second electric motor 23 is structured by, for example, an alternating current permanent magnet synchronous type motor (brushless DC motor), and is disposed at the radially outward side of the output shaft 12, coaxially therewith. The second electric motor 23 has the stator 28 secured to the inner peripheral surface of the case member 14, and the rotor 29 disposed freely rotatably at the radially inward side of the stator 28 with a predetermined air gap G2 left therebetween. As for the rotor 29, a cylindrical shaft portion (hereinafter, referred to as "boss portion" or "rotor boss portion") 29a is formed on the radially inward side thereof. Step portions 48, 50 are formed in an outer peripheral surface of a front portion of the boss portion 29a and an outer peripheral surface of a rear portion thereof, respectively. The rotor 29 is freely rotatably supported by the case member 14 via ball bearings v, w that are fitted between the step portions 48, 50 and the partition walls D, E in a state of being positioned in the front-to-rear direction. That is, the rotor 29 of the second electric motor 23 is supported by a both-end support structure in which a front side of the rotor 29 is supported on the front partition wall D via the ball bearing v, and a rear side thereof is supported on the rear partition wall (rear wall) E via the ball bearing w.

The sleeve 33, being integral with the sun gear S1, is secured to a front end of the boss portion 29a. The rotor 29 and the sun gear S1, formed integrally with each other, are freely relatively rotatable with respect to the second output shaft $12_2$, via the bearings l, m, x that are secured to the outer peripheral surface of the second output shaft $12_2$. Incidentally, the bearings m, x are disposed at positions that correspond to the bearings v, w in respect of the arrangement position in the front-to-rear direction. Thus, the rotor 29 of the second electric motor 23 is freely rotatably supported by the case member 14 and the output shaft 12 in a fashion such that the rotor 29 is clamped by the bearings v, w secured to the partition walls D, E and the bearings m, x secured to the outer peripheral surface of the output shaft 12. Therefore, the position of the rotor 29 in the front-to-rear direction and the radial direction are secured with good precision. Therefore, for example, even in a case where a force acts on the case member 14 so as to curve it in the top-to-bottom direction or the left-to-right direction, the predetermined air gap G2 between the stator 28 and the rotor 29 can be maintained with good precision. Incidentally, as previously described, the second electric motor 23 is connected to the HV battery via an inverter, in a manner similar to the first electric motor 20.

The case member 14, housing the motive power distributing planetary gear 21, the first electric motor 20, the transmission 22, and the second electric motor 23 as described above, has a rearward extending boss portion 14b in a radially inward-side portion of the rearmost partition wall E. By this boss portion 14b, the extended shaft $12_3$ is freely rotatably supported via bearings y, z.

Furthermore, in a rear end portion 14c of the case member 14, a radially outward side of the partition wall E is formed to have a great wall thickness, thus structuring an attachment portion (mount portion) M. A coupling portion 14d at a front end side of the case member 14 is connected to the internal combustion engine 5 rubber-mounted on the vehicle body 4 (see FIG. 1). A rear end side of the case member 14 is rubber-mounted on a portion 4a of the vehicle body through the use of the attachment portion M. That is, the portion 4a of the vehicle body is provided with a gum seat 51, to which a stay 55 is secured by a bolt 52, a washer 53, and a nut 54. Then, the case member 14 is attached to the stay 55 with a bolt 56 screwed to the attachment portion at the rear end portion 14c of the case member 14. Incidentally, after the attachment, the bolt 56 will not fall out of the attachment portion of the rear end portion 14c if the bolt 56 should loosen, because of a structure in which a gap G3 between the bolt 52 on the side of the portion 4a of the vehicle body and the bolt 56 on the side of the case member 14 is shorter than the fastening length (screwing length) of the bolt 56. Therefore, there is no fear the rear end side of the case member 14 will fall off from the portion 4a of the vehicle body. Incidentally, although the mount portion M, shown in FIG. 3, is provided on the rear end portion 14c rearward of the second electric motor 23, the mount portion M is not limited so, but may also be provided on a portion of the case member 14 that overlaps with the second electric motor 23 in the direction of the axis.

Figure 4:
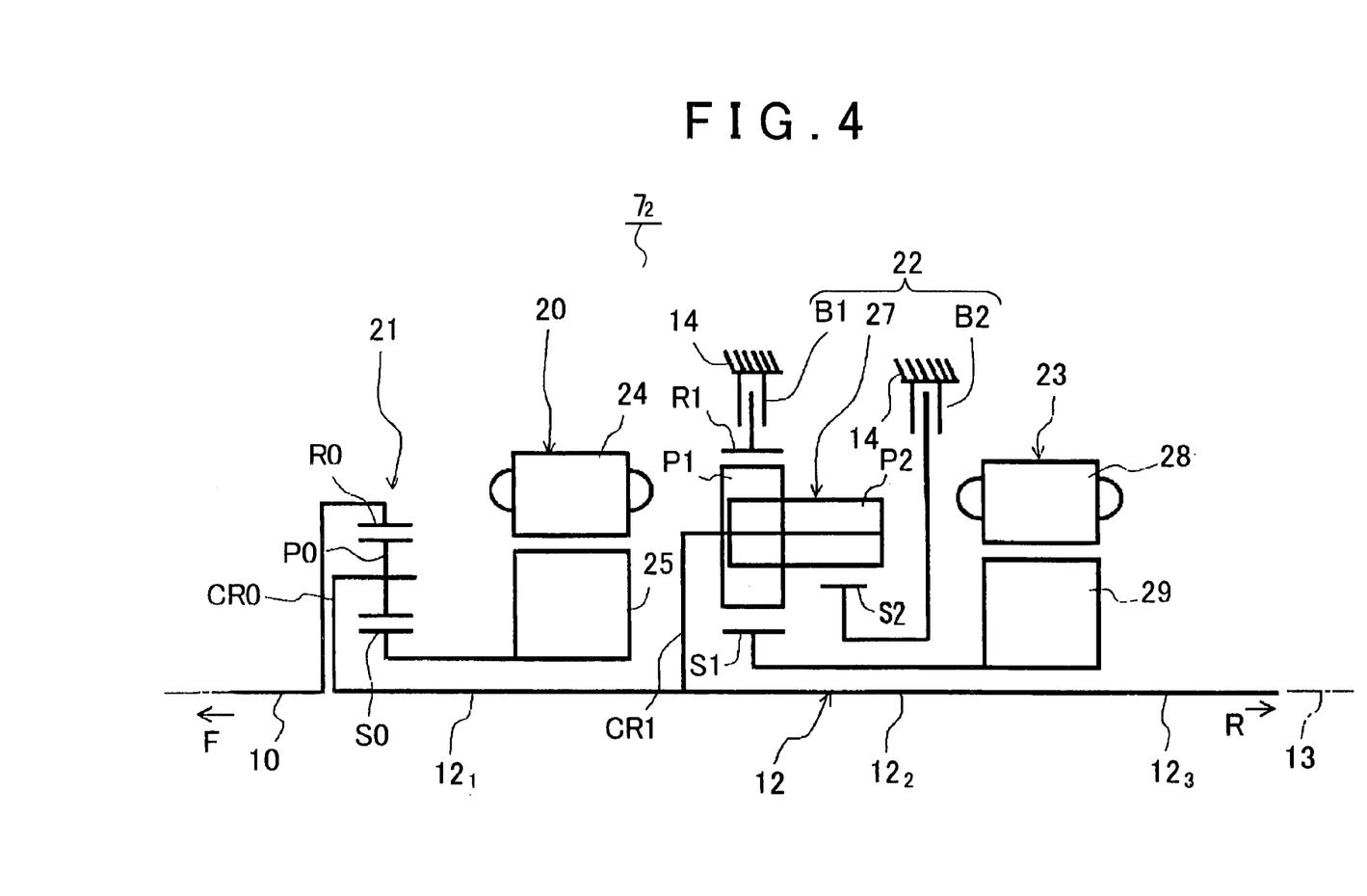
FIG. 4 is a schematic diagram showing a hybrid drive apparatus according to another exemplary embodiment.

Next, a partly modified hybrid drive apparatus $7_1$ will be described with reference to FIGS. 4 and 5. Incidentally, this embodiment is different from the one shown in FIGS. 2 and 3 merely in the motive power distributing planetary gear 21 and the output shaft 12. The other portions are the same, and are therefore represented by the same reference numerals, and a description thereof is limited to what is necessary to reflect the changes.

In a hybrid drive apparatus $7_2$, similar to the foregoing one, a motive power distributing planetary gear 21, a first electric motor 20, a transmission 22, and a second electric motor 23 are disposed sequentially from a front side (internal combustion engine side) on one axis 13, and an output shaft 12 is disposed extending substantially through the entire length of a case member (transmission case) 14. The output shaft 12 is divided into a first output shaft $12_1$, a second output shaft $12_2$, and an extended shaft $12_3$ in that order from the front side.

As for the motive power distributing planetary gear 21, its ring gear (first rotating element) R0 is coupled to an input shaft 10, its carrier (third rotating element) CR0 to the first output shaft $12_1$, and its sun gear (second rotating element) S0 to a rotor 25 of the first electric motor 20.

Figure 5:
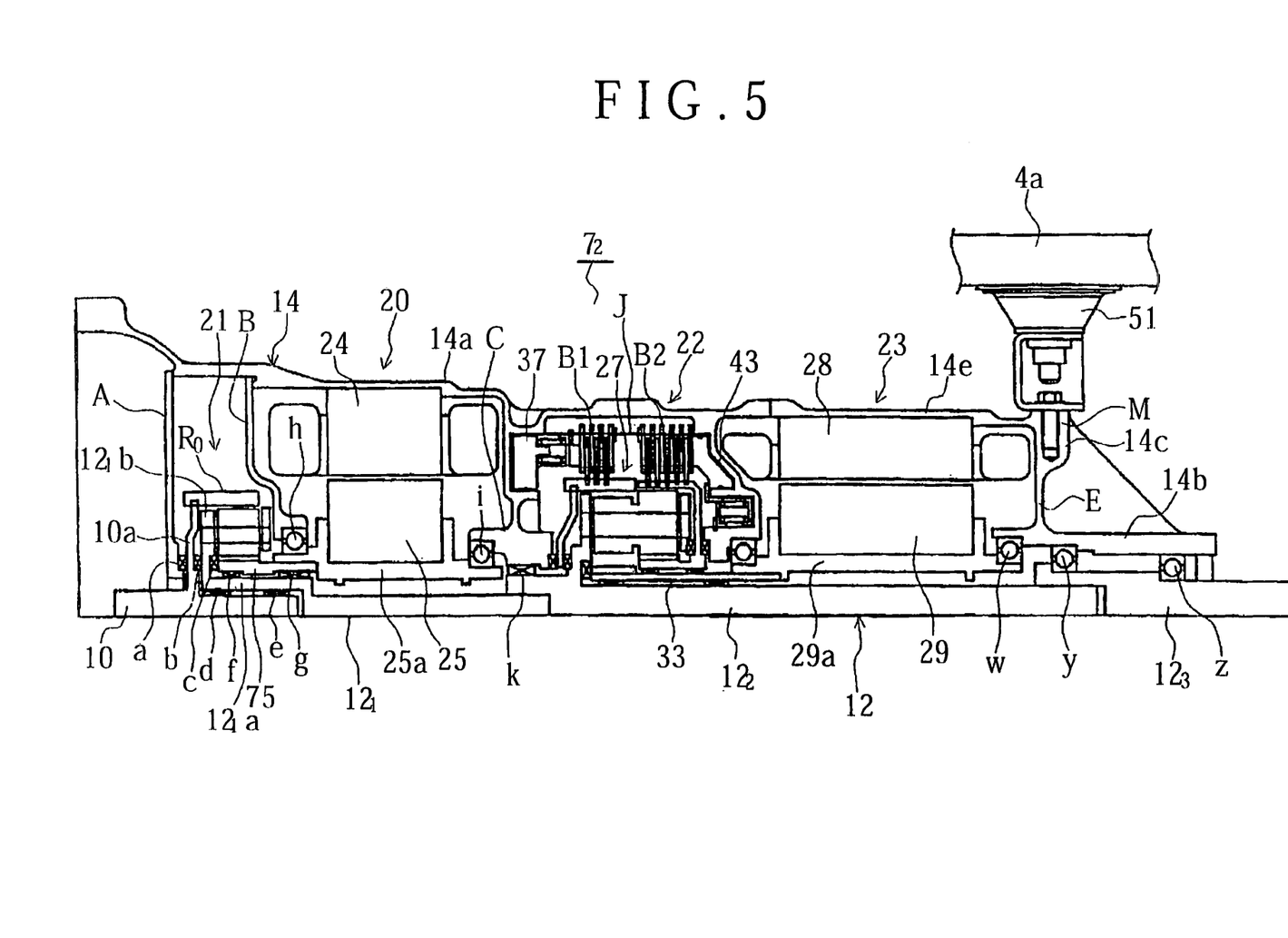
FIG. 5 is a longitudinal sectional view showing a structure of the hybrid drive apparatus according to yet another exemplary embodiment.

As shown in FIG. 5, the shaft diameter of the main portion of the first output shaft $12_1$ is less than the shaft diameter of the main portion of the second output shaft $12_2$, and the shaft diameter of the main portion of the second output shaft $12_2$ is formed to be less than the diameter of the main portion of the extended shaft $12_3$. A rear end portion of the first output shaft $12_1$ is spline-fitted to a front end portion of the second output shaft $12_2$, with an overlap where the second output shaft $12_2$ is on the outer peripheral side. A rear end portion of the second output shaft $12_2$ is spline-fitted to a front end portion of the extended shaft $12_3$, with an overlap where the extended shaft $12_3$ is on the outer peripheral side. A front side of the first output shaft $12_1$ forms a sleeve portion $12_{1a}$. The input shaft 10 is freely rotatably supported on an inner peripheral portion of the sleeve portion $12_{1a}$ via needle or slip bearings d, e.

On the input shaft 10, a flange portion 10a, protruded to a radially outward side, is integrally (or separately) formed. The ring gear R0 of the motive power distributing planetary gear 21 is engaged with and secured to a distal end of the flange portion 10a. A flange portion $12_{1b}$, protruded to a radially outward side, is integrally (or separately) formed on a distal end of the sleeve portion $12_{1a}$ of the first output shaft. The flange portion $12_{1b}$ structures a front plate of the carrier CR0. A sleeve shaft 75 is formed integrally with a sun gear S0 and fitted to the radially outward side of the sleeve portion $12_{1a}$ via needle or slip bearings f, g. A rear end portion of the sleeve shaft 75 is integrally fitted to a front end portion of a rotor boss portion (shaft) 25a of the first electric motor 20.

The first electric motor 20, as in the preceding embodiment, is housed in a space sectioned by a front partition wall B and a rear partition wall C, and the rotor boss portion 25a is freely rotatably supported on the two partition walls B, C via ball bearings (shaft bearing members) h, i, by a both-end support structure. Furthermore, a front side of the first output shaft $12_1$ is supported by the needle or slip bearing (shaft bearing member) g, via the boss portion 25a and the sleeve shaft 75 that are overlapped and integral with each other (i.e., indirectly) by the ball bearing h on the front partition wall B. A rear end side of the first output shaft $12_1$ is supported together with a front end portion of the second output shaft $12_2$, that is overlapped and integral therewith, on the rear partition wall C by a radial bearing (shaft bearing member) k (i.e., directly thereby). Therefore, the first output shaft $12_1$ is supported on the partition walls B, C of the first electric motor 20 via the shaft bearing members g, k, by a both-end support structure. Incidentally, the input shaft 10 is positioned in the direction of the axis by thrust bearings a, b that clamp the flange portion 10a in the direction of the axis, and the first output shaft $12_1$ is positioned in the direction of the axis by thrust bearings b, c that clamp the flange portion $12_{1b}$ in the direction of the axis.

As for the second output shaft $12_2$, a front end portion thereof is supported together with first output shaft $12_1$ on the partition wall C (directly) by the bearing (shaft bearing member) k, and a rear end portion thereof is supported together with a front end portion of the extended shaft $12_3$, overlapped and integrated therewith, on the rear wall E (directly) by a bearing (shaft bearing member) y. Therefore, the second output shaft $12_2$ is supported on the partition walls C, E supporting the rotors 25, 29 of the electric motors 20, 23, via the shaft bearing members k, y by a both-end support structure.

Motive power is transferred to the first output shaft $12_1$ from the ring gear R0 of the motive power distributing planetary gear 21. To the second output shaft $12_2$, assist drive power from the second electric motor 23 is transferred through the transmission 22, in addition to the motive power from the first output shaft $12_1$. Therefore, compared with the first output shaft $12_1$, the second output shaft $12_2$ receives greater amounts of torque transferred, and therefore preferably has a correspondingly increased shaft diameter. In this embodiment, after the extended shaft $12_3$ is assembled to the case member 14b via the bearings y, z, the rear case member 14e, together with the second electric motor 23, is assembled. Then, the front case member 14a is assembled with the transmission 22 and the first electric motor 20 is assembled by inserting the second output shaft $12_2$ from front. After that, the first output shaft $12_1$, together with the motive power distributing planetary gear 21, is assembled from the front. Finally, the input shaft 10 is inserted from the front. The hybrid drive apparatus $7_2$ is thus assembled.

Thus, the output shaft 12, in which the first output shaft $12_1$ has a reduced diameter and the second output shaft $12_2$ has an increased diameter corresponding to the aforementioned transfer torques, is assembled. Furthermore, the bearing k supporting the front side of the second output shaft $12_2$ and the hydraulic actuator 37 of the first brake B1 are disposed so as to overlap with each other in the direction of the axis, and thus provide for downsizing of the hybrid drive apparatus in the direction of the axis. Still further, the bearing k supporting the front side of the second output shaft $12_2$ and the rotor shaft portion (boss portion) 25a of the first electric motor 20 are disposed so as to overlap with each other in radial directions, and thus provide for downsizing of the hybrid drive apparatus in the radial directions.

Next, modifications of the hybrid drive apparatus will be described with reference to FIGS. 6 to 8. Incidentally, although FIGS. 6 to 8 are schematic diagrams and therefore a divided structure and a support structure of the output shaft is not clear, structures of the output shaft similar to those in the foregoing exemplary embodiments are applied.

Figure 6:
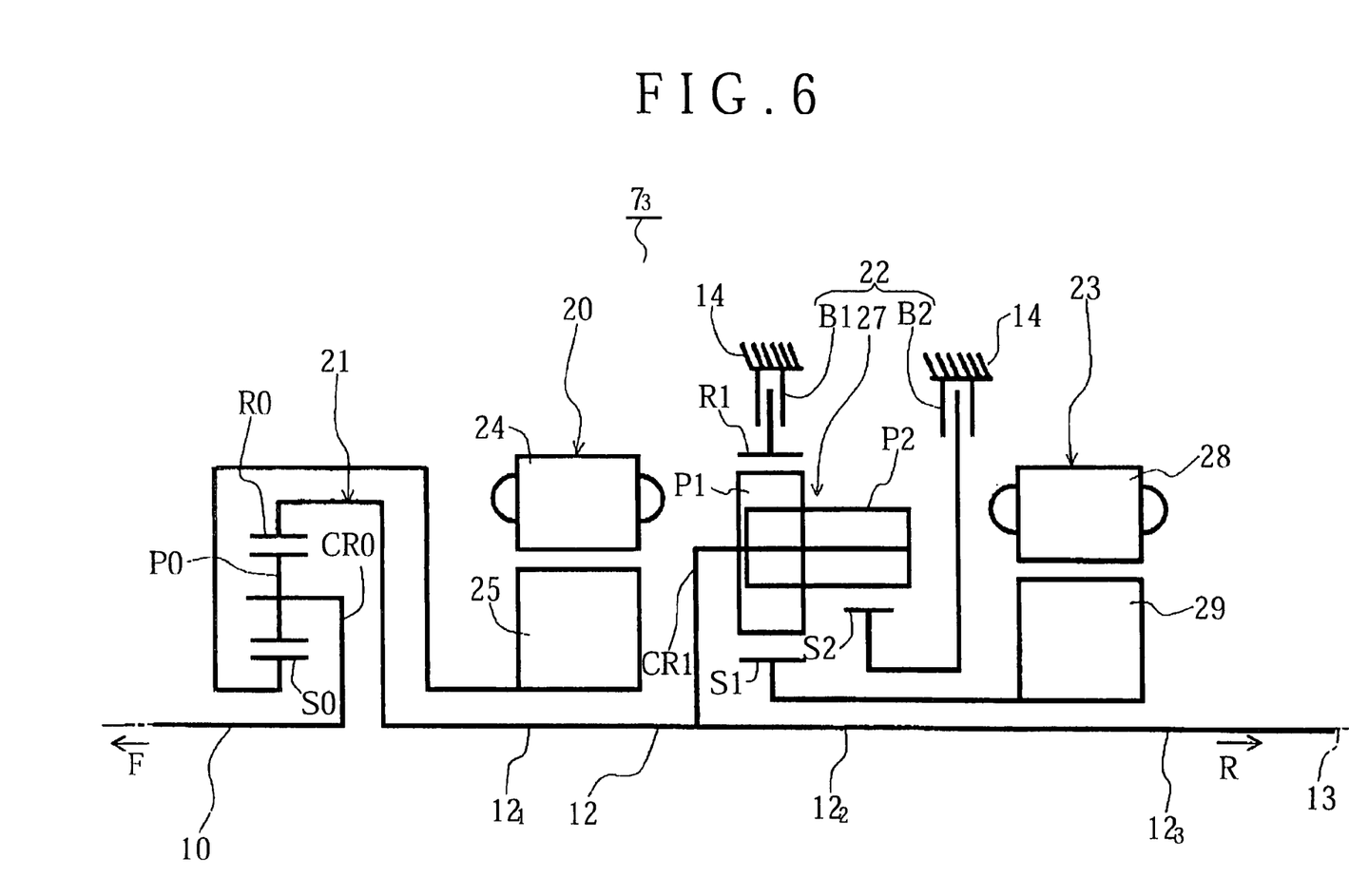
FIG. 6 is a schematic diagram showing a modification of the hybrid drive apparatus.

A hybrid drive apparatus $7_3$, shown in FIG. 6, is provided with a motive power distributing planetary gear 21, a first electric motor 20, a transmission 22 and a second electric motor 23 in that order from the vicinity of the internal combustion engine 5, as shown in FIG. 1, that is, from the front side toward the rear side. These components are all housed inside a case member 14 (see FIG. 1), and are arranged in alignment around one axis 13.

The motive power distributing planetary gear 21 is structured by a single-pinion planetary gear that is disposed coaxially with an input shaft 10. The motive power distributing planetary gear 21 has a carrier (first rotating element) CR0 that supports a plurality of pinions P0, and a sun gear (second rotating element) S0 and a ring gear (third rotating element) R0 that each mesh with the pinions P0. The carrier CR0 of the motive power distributing planetary gear 21 is coupled to the input shaft 10, the sun gear S0 is coupled to the rotor 25 of the first electric motor 20, and the ring gear R0 is coupled to the output shaft 12. The motive power distributing planetary gear 21, as described above, distributes the motive power input to the carrier CR0 via the input shaft 10 to the first electric motor 20 side via the sun gear S0 and to the output shaft 12 side via the ring gear R0, on the basis of the rotation control of the first electric motor 20. Incidentally, the motive power distributed to the first electric motor 20 is used for electric power generation. On the other hand, the motive power distributed to the output shaft 12 is used for driving the motor vehicle 1.

Figure 7:
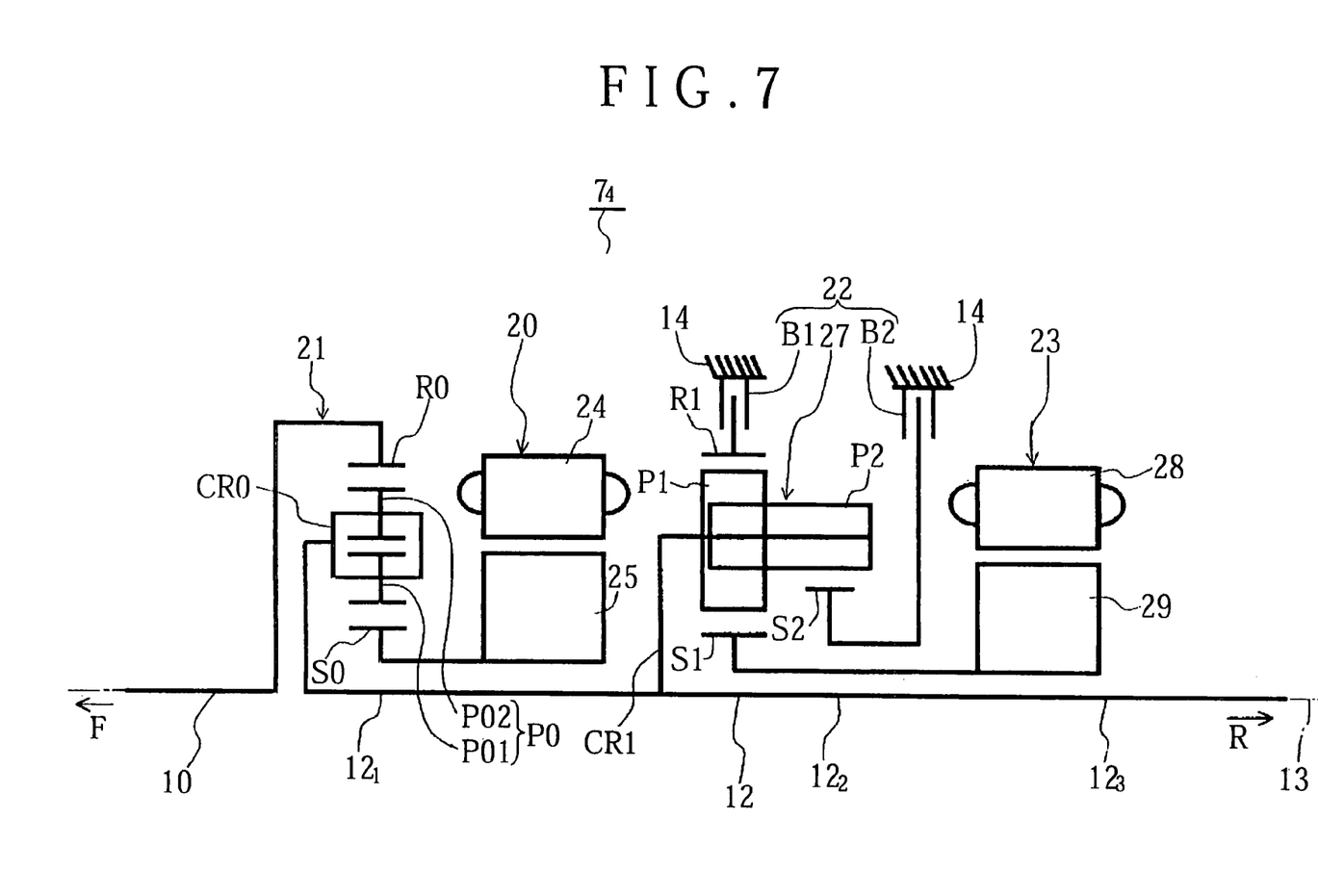
FIG. 7 is a schematic diagram showing a hybrid drive apparatus according to another modification.
Figure 8:
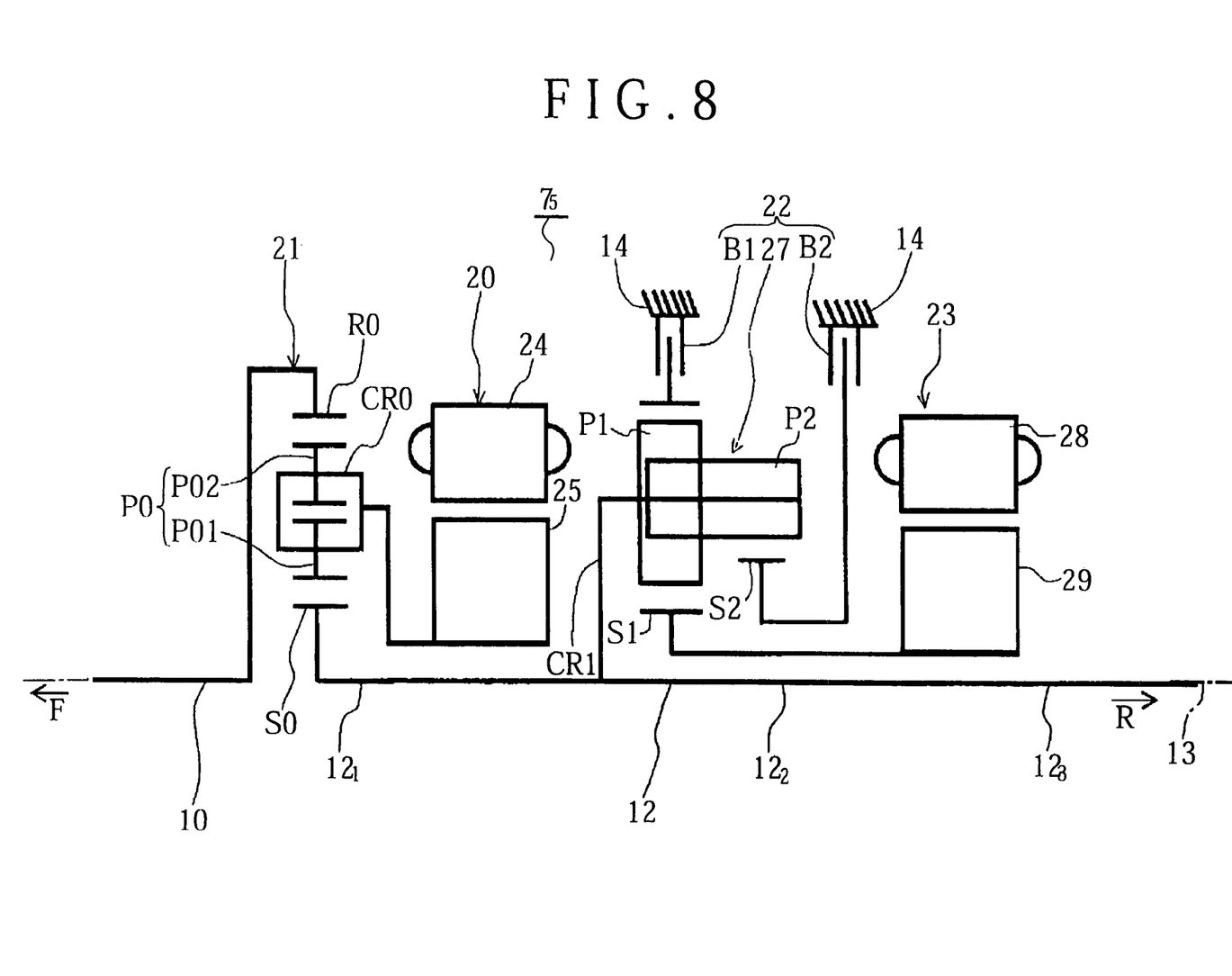
FIG. 8 is a schematic diagram showing a hybrid drive apparatus according to still another modification.

A hybrid drive apparatus $7_4$, shown in FIG. 7, is provided with a motive power distributing planetary gear 21, a first electric motor 20, a transmission 22, and a second electric motor 23 in that order from the front side toward the rear side.

The motive power distributing planetary gear 21 is structured by a double-pinion planetary gear that is disposed coaxially with the output shaft 12. The motive power distributing planetary gear 21 has a carrier (third rotating element) CR0 that supports a plurality of pinions P0 (P01, P02), and a sun gear (second rotating element) S0 and a ring gear (first rotating element) R0 that each mesh with the pinions P01, P02. The ring gear R0 of the motive power distributing planetary gear 21 is coupled to the input shaft 10, the sun gear S0 is coupled to the rotor 25 of the first electric motor 20, and the carrier CR0 is coupled to the output shaft 12. The motive power distributing planetary gear 21 as described above distributes the motive power input to the ring gear R0 via the input shaft 10 to the first electric motor 20 side via the sun gear S0 and to the output shaft 12 side via the carrier CR0 on the basis of the rotation control of the first electric motor 20.

A hybrid drive apparatus $7_5$, shown in FIG. 8, is provided with a motive power distributing planetary gear 21, a first electric motor 20, a transmission 22, and a second electric motor 23 in that order from the front side toward the rear side.

The motive power distributing planetary gear 21 is structured by a double-pinion planetary gear that is disposed coaxially with the output shaft 12. The motive power distributing planetary gear 21 has a carrier (second rotating element) CR0 that supports a plurality of pinions P0 (P01, P02), and a sun gear (third rotating element) S0 and a ring gear (first rotating element) R0 that each mesh with the pinions P01, P02. The ring gear R0 of the motive power distributing planetary gear 21 is coupled to the input shaft 10, the carrier CR0 is coupled to the rotor 25 of the first electric motor 20, and the sun gear S0 is coupled to the output shaft 12. The motive power distributing planetary gear 21 as described above distributes the motive power input to the ring gear R0 via the input shaft 10 to the first electric motor 20 side via the carrier CR0 and to the output shaft 12 side via the sun gear S0 on the basis of the rotation control of the first electric motor 20.

As discussed above, in the exemplary embodiments, the first output shaft and the second output shaft have both-end support structures provided by support portions that are integral with a case member. Therefore, it is possible to improve the support precision for the output shaft, and secure a reliability of the hybrid drive apparatus. Furthermore, increased service life can be achieved.

Additionally, the second electric motor, which is the heaviest element, is disposed at a rearmost end, and a rear end portion of the case member where the second electric motor is positioned is made mountable on the vehicle body. Therefore, an anti-vibration characteristic can be improved, and the quietness in the cabin can be improved because the second electric motor, which produces less noise, is disposed near the cabin.

Also, the first electric motor is disposed adjacent to the motive power distributing planetary gear, and the second electric motor is disposed adjacent to the transmission. Therefore, the motive power transfer becomes reasonable.

Further, the first and second output shafts are supported by partition walls or a rear wall that supports a rotor of the first or second electric motor. Therefore, it is possible to improve the support precision of the first and second output shafts without the need for a special support member for supporting the output shaft, and to achieve the downsizing of the hybrid drive apparatus and particularly the downsizing in the direction of the axis.

Additionally, the shaft diameter of the main portion of the front-side first output shaft is made less than the shaft diameter of the main portion of the rear-side second output shaft, corresponding to the transfer torques. Therefore, an overlap-coupling portion between the first output shaft and the second output shaft, in particular, where the second output shaft, larger in diameter, is on the radially outward side, becomes common to the support portions of the case member. Thus, the support structure becomes reasonable. Furthermore, it is possible to secure a capacity of the first electric motor with a compact structure by disposing the first electric motor on the first output shaft, which is smaller in diameter.

As a result, it is possible to provide a motor vehicle that is good in fuel economy and excellent in quietness with reduced vibrations, when mounting the hybrid drive apparatus in an FR type motor vehicle.

What is claimed is:

1. A hybrid drive apparatus comprising:
   an input shaft for inputting motive power from an internal combustion engine;
   an output shaft that is disposed in alignment with said input shaft on an axis and that operates in association with a driving wheel;
   a first electric motor that is disposed on said one axis and that has a stator and a rotor;
   a motive power distributing planetary gear that is disposed on said axis and that has a first rotating element connected to said input shaft, a second rotating element connected to the rotor of said first electric motor, and a third rotating element connected to said output shaft;
   a second electric motor that is disposed on said axis and that has a stator and a rotor; and
   a transmission that is disposed on said axis, and that speed-shifts rotation of the rotor of said second electric motor and then transfers rotation to said output shaft,
   wherein said first electric motor, said motive power distributing planetary gear, said second electric motor and said transmission are housed in a case member, and are aligned and thus disposed on said axis with said motive power distributing planetary gear being at a foremost end side, and said stators of said first electric motor and said second electric motor are secured to said case member, and
   wherein said output shaft is divided into a first output shaft and a second output shaft, and joined so as to rotate together, and
   wherein said third rotating element of said motive power distributing planetary gear is coupled to said first output shaft, and said transmission is coupled to said second output shaft.

2. The hybrid drive apparatus according to claim 1, wherein both end portions of said first output shaft and said second output shaft are directly or indirectly supported, via a shaft bearing member, on a support portion that is integral with said case member, so that the first and second output shafts have a both-end support structure.

3. The hybrid drive apparatus according to claim 2, wherein said second electric motor is disposed at a rearmost end on said axis, and
   wherein a mount attachment portion mountable on a vehicle body is provided on a rear end portion of said case member.

4. The hybrid drive apparatus according to claim 3, wherein said first output shaft is supported by a front partition wall and a rear partition wall of said case member that support said rotor of said first electric motor, and
   wherein said second output shaft is supported by said rear partition wall of said first electric motor and a rear wall that supports said rotor of said second electric motor.

5. The hybrid drive apparatus according to claim 4, wherein said second output shaft is larger in diameter than said first output shaft.

6. A motor vehicle comprising:
   a vehicle body suspended by a front wheel and a rear wheel;
   the internal combustion engine mounted on said vehicle body; and
   a hybrid drive apparatus according to claim 5 mounted on said vehicle body,
   wherein said internal combustion engine and said hybrid drive apparatus are disposed in that order from a front of the said vehicle body so that an output shaft of said internal combustion engine is aligned on said axis and the axis is disposed in a front-to-rear direction of the vehicle body, and
   wherein said input shaft of said hybrid drive apparatus is coupled to the output shaft of said internal combustion engine, and said output shaft of said hybrid drive apparatus is associated with said rear wheel.

7. The hybrid drive apparatus according to claim 3, wherein said motive power distributing planetary gear, said first electric motor, said transmission and said second electric motor are disposed on said axis sequentially from a front end side.

8. The hybrid drive apparatus according to claim 7, wherein said second output shaft is larger in diameter than said first output shaft.

9. A motor vehicle comprising:

a vehicle body suspended by a front wheel and a rear wheel;

the internal combustion engine mounted on said vehicle body; and a hybrid drive apparatus according to claim 8 mounted on said vehicle body, wherein said internal combustion engine and said hybrid drive apparatus are disposed in that order from a front of the said vehicle body so that an output shaft of said internal combustion engine is aligned on said axis and the axis is disposed in a front-to-rear direction of the vehicle body, and wherein said input shaft of said hybrid drive apparatus is coupled to the output shaft of said internal combustion engine, and said output shaft of said hybrid drive apparatus is associated with said rear wheel.

10. The hybrid drive apparatus according to claim 1, wherein said second electric motor is disposed at a rearmost end on said axis, and wherein a mount attachment portion mountable on a vehicle body is provided on a rear end portion of said case member.

11. The hybrid drive apparatus according to claim 10, wherein said first output shaft is supported by a front partition wall and a rear partition wall of said case member that support said rotor of said first electric motor, and wherein said second output shaft is supported by said rear partition wall of said first electric motor and a rear wall that supports said rotor of said second electric motor.

12. The hybrid drive apparatus according to claim 1, wherein said motive power distributing planetary gear, said first electric motor, said transmission and said second electric motor are disposed on said axis sequentially from a front end side.

13. The hybrid drive apparatus according to claim 1, wherein said second output shaft is larger in diameter than said first output shaft.

14. A motor vehicle comprising:

a vehicle body suspended by a front wheel and a rear wheel;

the internal combustion engine mounted on said vehicle body; and a hybrid drive apparatus according to claim 1 mounted on said vehicle body, wherein said internal combustion engine and said hybrid drive apparatus are disposed in that order from a front of the said vehicle body so that an output shaft of said internal combustion engine is aligned on said axis and the axis is disposed in a front-to-rear direction of the vehicle body, and wherein said input shaft of said hybrid drive apparatus is coupled to the output shaft of said internal combustion engine, and said output shaft of said hybrid drive apparatus is associated with said rear wheel.

* * * * *

UNITED STATES PATENT AND TRADEMARK OFFICE
CERTIFICATE OF CORRECTION

| | | |
|---|---|---|
| PATENT NO. | : 7,621,359 B2 | Page 1 of 1 |
| APPLICATION NO. | : 11/229201 | |
| DATED | : November 24, 2009 | |
| INVENTOR(S) | : Kano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Twenty-sixth Day of October, 2010

David J. Kappos
*Director of the United States Patent and Trademark Office*